(12) United States Patent
Lim et al.

(10) Patent No.: US 11,335,981 B2
(45) Date of Patent: May 17, 2022

(54) SECONDARY BATTERY

(71) Applicant: LG Chem, Ltd., Seoul (KR)

(72) Inventors: Seong Yoon Lim, Daejeon (KR); Mi Geum Choi, Daejeon (KR)

(73) Assignee: LG Energy Solution, Ltd.

( * ) Notice: Subject to any disclaimer, the term of this patent is extended or adjusted under 35 U.S.C. 154(b) by 594 days.

(21) Appl. No.: 15/759,032

(22) PCT Filed: Jul. 21, 2017

(86) PCT No.: PCT/KR2017/007886
§ 371 (c)(1),
(2) Date: Mar. 9, 2018

(87) PCT Pub. No.: WO2018/021765
PCT Pub. Date: Feb. 1, 2018

(65) Prior Publication Data
US 2020/0161622 A1    May 21, 2020

(30) Foreign Application Priority Data
Jul. 28, 2016   (KR) .................. 10-2016-0096316

(51) Int. Cl.
*H01M 50/572* (2021.01)
*H01M 50/463* (2021.01)
*H01M 50/46* (2021.01)

(52) U.S. Cl.
CPC ......... *H01M 50/572* (2021.01); *H01M 50/46* (2021.01); *H01M 50/463* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2010/0330422 A1 | 12/2010 | Kim et al. | |
| 2011/0135980 A1 | 6/2011 | Morita et al. | |
| 2012/0299492 A1* | 11/2012 | Egawa | H05B 45/10 315/192 |

(Continued)

FOREIGN PATENT DOCUMENTS

| CN | 101931103 A | 12/2010 |
|---|---|---|
| CN | 105493309 A | 4/2016 |

(Continued)

OTHER PUBLICATIONS

Extended European Search Report including Written Opinion for Application No. EP17834707.6 dated Aug. 21, 2018.

(Continued)

*Primary Examiner* — Brian R Ohara
(74) *Attorney, Agent, or Firm* — Lerner, David, Littenberg, Krumholz & Mentlik, LLP

(57) ABSTRACT

The present invention relates to a secondary battery. The secondary battery according to the present invention comprises an electrode stack in which an electrode and a separator are combined with each other and a ground part grounding the electrode stack to the outside, wherein the ground part comprises a ground member disposed at one side of the separator to allow abnormal current flowing from the electrode to the one side of the separator to be introduced therein.

18 Claims, 10 Drawing Sheets

(56) References Cited

U.S. PATENT DOCUMENTS

2015/0255772 A1   9/2015  Jung et al.
2016/0197386 A1   7/2016  Moon et al.

FOREIGN PATENT DOCUMENTS

| JP | 2005122951 A | 5/2005 |
| JP | 2008258073 A | 10/2008 |
| JP | 2012028023 A | 2/2012 |
| JP | 2016103425 A | 6/2016 |
| KR | 100919691 B1 | 10/2009 |
| KR | 20140015647 A | 2/2014 |
| KR | 20140036360 A | 3/2014 |
| KR | 101595269 B1 | 2/2016 |

OTHER PUBLICATIONS

Search report from International Application No. PCT/KR2017/007886, dated Oct. 26, 2017.
Chinese Search Report for Application No. 201780003242.8 dated Apr. 13, 2020, 1 page.

\* cited by examiner

SECONDARY BATTERY

CROSS-REFERENCE TO RELATED APPLICATION

This application is a national phase entry under 35 U.S.C. § 371 of International Application No PCT/KR2017/007886, filed Jul. 21, 2017, which claims priority to Korean Patent Application No. 10-2016-0096316, filed on Jul. 28, 2016, the disclosures of which are incorporated herein by reference.

TECHNICAL FIELD

The present invention relate to a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Also, secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Typically, there are high demands for pouch-type secondary batteries which are capable of being applied to products such as mobile phones having thin thicknesses in terms of the shapes of the batteries. Also, there are high demands for lithium secondary batteries such as lithium ion batteries and lithium ion polymer batteries, which have high energy densities, high discharge voltages, and excellent output safety in terms of the materials of the batteries.

In small-sized mobile devices, one or several battery cells per one device are used. However, middle- or large-sized devices such as vehicles require high output large capacity. Thus, a middle- or large-sized battery pack in which a plurality of battery cells as unit cells are electrically connected is used, and also, as an increase in capacitive density is required, cells having higher energy per cell are being developed.

Since the middle- or large-sized battery pack is necessary to be manufactured so as to have a small size and a light weight, a square shape battery, a pouch shape battery, etc., which may be stacked with high density and light weight when compared with the capacity, are mainly manufactured as the battery cells of the middle- or large-sized battery pack. Among them, the pouch-type battery having a small weight, low possibility of electrolyte leakage, and a low manufacturing cost is particularly attracting much attention.

The pouch-type battery is influential as the unit cell of the middle- or large-sized battery pack due to its various advantages. However, there is a problem that a pyrotechnic substance such as an electrolyte leaks to increase the risk of fire when a battery case has low mechanical strength, and a sealing part is separated. Also, in case in which an external object such as a nail or the like penetrates through the cell, when a positive electrode and a negative electrode come into direct contact with each other, sudden current flows between the positive electrode and the negative electrode to generate heat, sparks, and the like and thereby to cause outbreak of fire.

In the middle- or large-sized battery pack in which a plurality of unit cells are electrically connected to each other for the purpose of high-power large-capacity, the above-described firing is a vary serious risk factor that hinders safety.

DISCLOSURE OF THE INVENTION

Technical Problem

One aspect of the present invention is to provide a secondary battery that is capable of improving safety of the battery against an external impact.

Technical Solution

A secondary battery according to an embodiment of the present invention comprises an electrode stack in which an electrode and a separator are combined with each other and a ground part grounding the electrode stack to the outside, wherein the ground part comprises a ground member disposed at one side of the separator to allow abnormal current flowing from the electrode to the one side of the separator to be introduced therein.

Advantageous Effects

In the secondary battery according to the present invention, when the abnormal current flows due to the external impact, the abnormal current may flow to the outside through the ground part to prevent the heat and the sparks from being generated. Therefore, the safety of the battery against the external impact may be improved.

MODE FOR CARRYING OUT THE INVENTION

Figure 1:
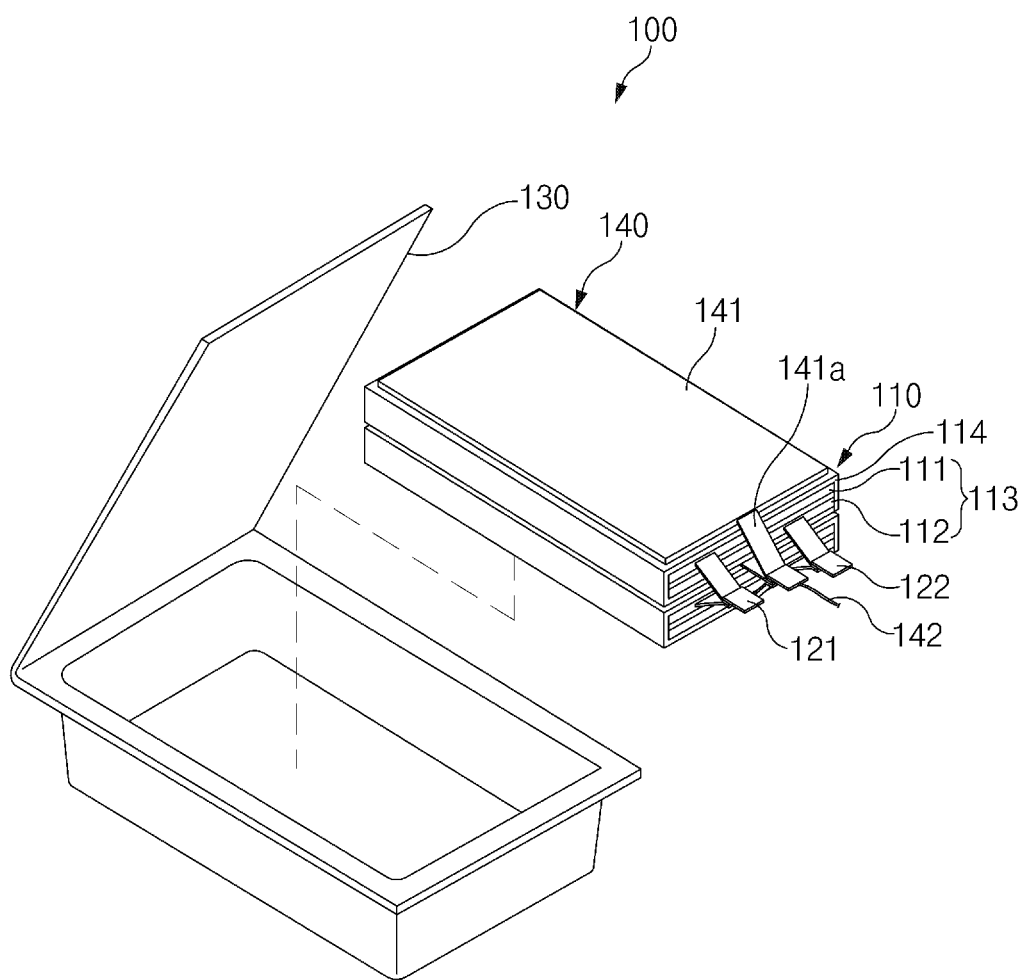
FIG. 1 is a perspective view of a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

FIG. 1 is a perspective view of a secondary battery according to an embodiment of the present invention.

Referring to FIG. 1, a secondary battery 100 according to an embodiment of the present invention comprises an electrode stack 110 and a ground part 140 grounding the electrode stack 110 to the outside. Also, the secondary battery according to an embodiment of the present invention may comprise a battery case 130 accommodating the electrode stack 110.

Hereinafter, the secondary battery according to an embodiment of the present invention will be described in more detail with reference to FIGS. 1 to 10.

Referring to FIG. 1, the electrode stack 110 may be a chargeable and dischargeable power generation element and manufactured by combining an electrode 113 with a separator 114. Here, the electrode stack 110 may be provided with, for example, a jelly-roll type, a stacked-type, or a stack/folding type.

The separator 114 may be disposed on each of both surfaces of the electrode 113 or disposed to surround an outer surface of the electrode 113.

The electrode 113 comprises a positive electrode 111 and a negative electrode 112. Thus, the electrode stack 110 may have a structure in which the positive electrode 111/the separator 114/the negative electrode 113 are alternately stacked. Here, the separator 114 may be disposed between the positive electrode 111 and the negative electrode 112 and disposed outside the positive electrode 111 and outside the negative electrode 112. Here, the separator 114 may be disposed to surround the entire electrode stack 110 in which the positive electrode 111/the separator 114/the negative electrode 113 are stacked.

Furthermore, the separator 114 is made of an insulation material to electrically insulate the positive electrode 111 from the negative electrode 112. Here, the separator 114 may be made of, for example, a polyolefin-based resin film such as polyethylene or polypropylene having micropores.

The electrode stack 110 may comprises a positive electrode terminal 121 and a negative electrode terminal 122. Here, the positive electrode terminal 121 may be electrically connected to a side surface of the positive electrode 111, and the negative electrode terminal 122 may be electrically connected to a side surface of the electrode 112.

The ground part 140 grounds the electrode stack 110 to the outside. Here, the ground part 140 may comprise a ground member 141 into which abnormal current of the electrode stack 110 is introduced and a ground line 142 grounding the ground member 141 to the outside. Thus, the abnormal current introduced into the ground member 141 may flow to the outside of the battery case 130 through the ground part 140.

In more detail, the ground member 141 may be disposed at one side of the separator 114 so that the abnormal current flowing from the electrode 113 to one side of the separator 114 is introduced into the ground member 141.

Also, the ground member 141 may be disposed on the outermost surface of the electrode stack 110 in a stacking direction of the electrode stack 110 so that the abnormal current flowing from the electrode 113 to the outermost surface of the electrode stack 110 is introduced into the ground member 141. Here, the separator 114 may be disposed on the outermost portion of the electrode stack 110, and the ground member 141 may be disposed on an outer surface of the separator 114. Here, the ground member 141 may be disposed on one or more surfaces of one surface and the other surface of the electrode stack 110 in the stacking direction of the electrode stack 110.

Also, the ground member 141 may be made of a flexible material. Here, the ground member 141 may be provided as a foil or thin film. The ground member 141 may have a thickness of 1 um to 2,000 um.

Also, the ground member 141 may be made of a conductive material. Here, the ground member 141 may be made of an aluminum or copper material.

Furthermore, the ground member 141 may have a plate shape. For example, the ground member 141 may have a rectangular plate shape.

Figure 2:
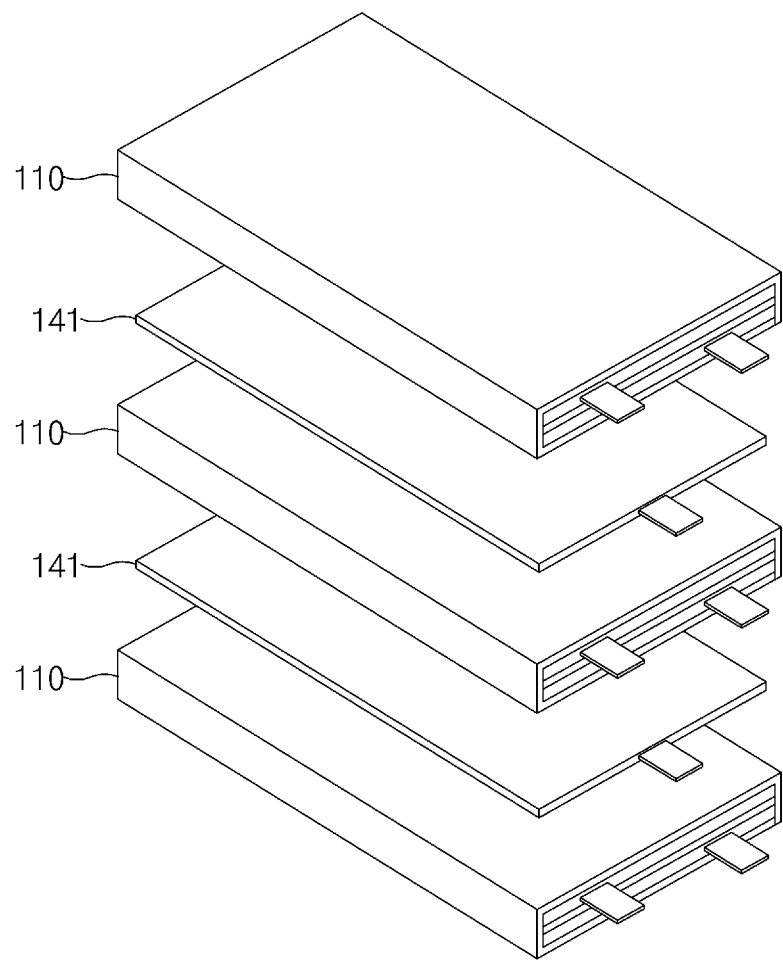
FIG. 2 is an exploded perspective view illustrating an example in which a ground member is disposed on an electrode stack in the secondary battery according to an embodiment of the present invention.
Figure 3:
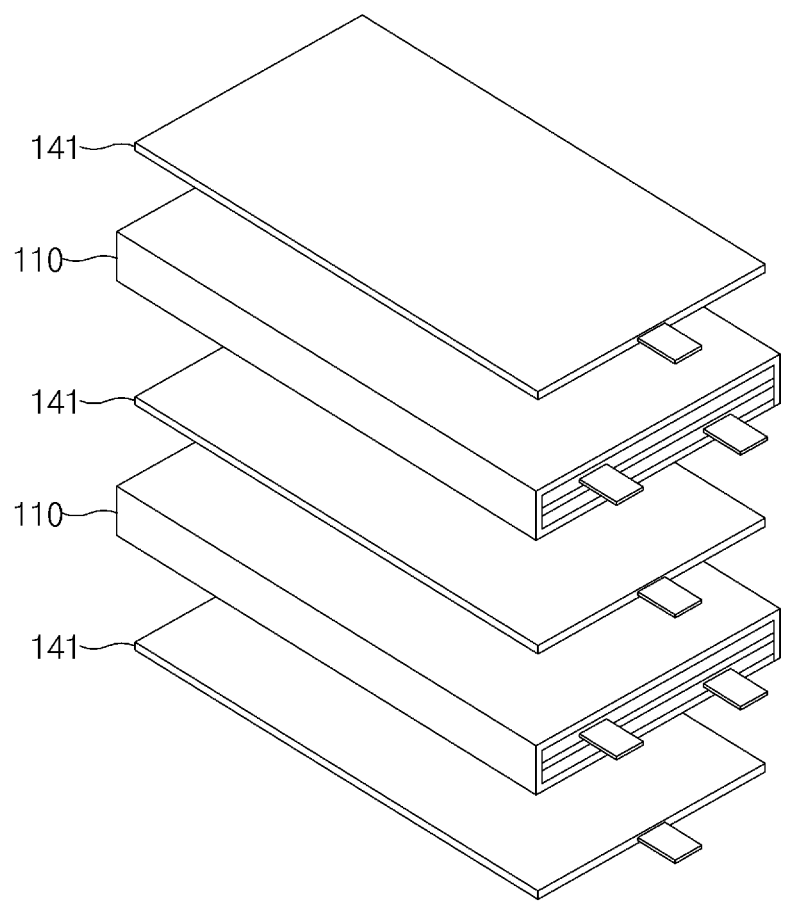
FIG. 3 is an exploded perspective view illustrating another example in which the ground member is disposed on the electrode stack in the secondary battery according to an embodiment of the present invention.

FIG. 2 is an exploded perspective view illustrating an example in which the ground member is disposed on the electrode stack in the secondary battery according to an embodiment of the present invention, and FIG. 3 is an exploded perspective view illustrating another example in which the ground member is disposed on the electrode stack in the secondary battery according to an embodiment of the present invention.

The electrode stack 110 may be provided in plurality. For example, referring to FIG. 2, the ground member 141 may be disposed between the plurality of electrode stacks 110. For another example, referring to FIG. 3, the ground member 141 may be provided in plurality, and the plurality of ground members 141 may be disposed on both the outermost sides of the plurality of electrode stacks 110.

Figure 4:
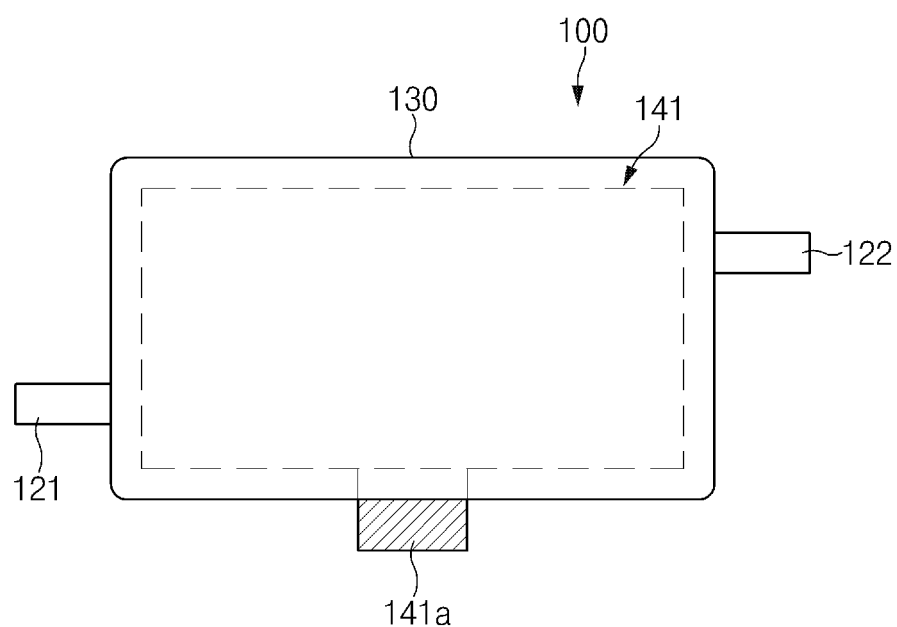
FIG. 4 is a plan view illustrating a first example in which an electrode and a ground terminal are disposed in the secondary battery according to an embodiment of the present invention.
Figure 5:
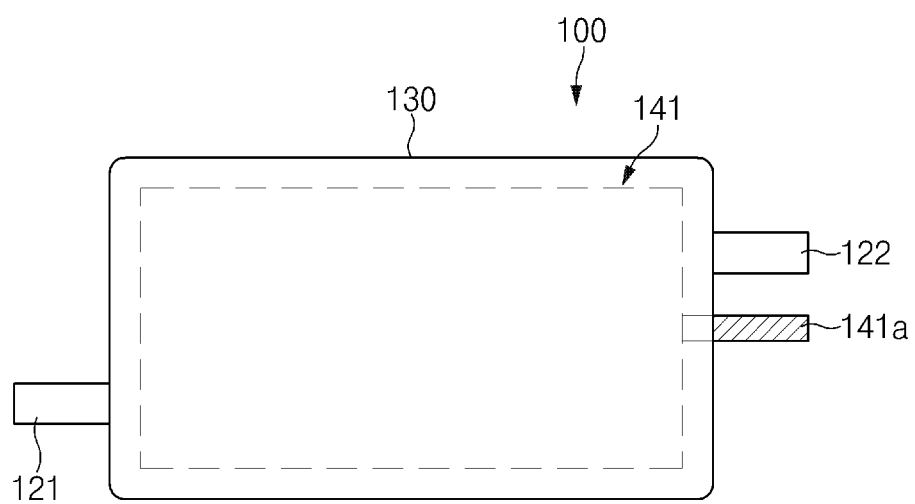
FIG. 5 is a plan view illustrating a second example in which the electrode and the ground terminal are disposed in the secondary battery according to an embodiment of the present invention.

FIG. 4 is a plan view illustrating a first example in which the electrode and the ground terminal are disposed in the secondary battery according to an embodiment of the present invention, and FIG. 5 is a plan view illustrating a second example in which the electrode and the ground terminal are disposed in the secondary battery according to an embodiment of the present invention.

Figure 6:
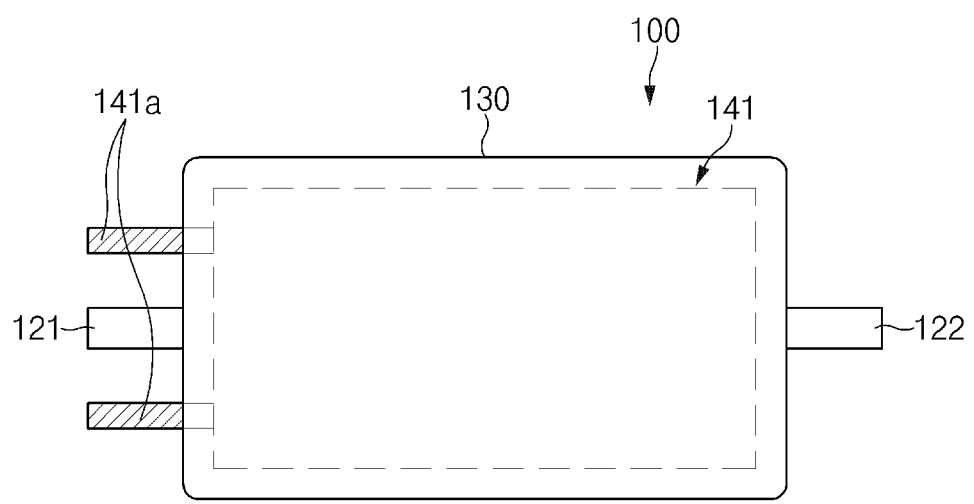
FIG. 6 is a plan view illustrating a third example in which the electrode and the ground terminal are disposed in the secondary battery according to an embodiment of the present invention.
Figure 7:
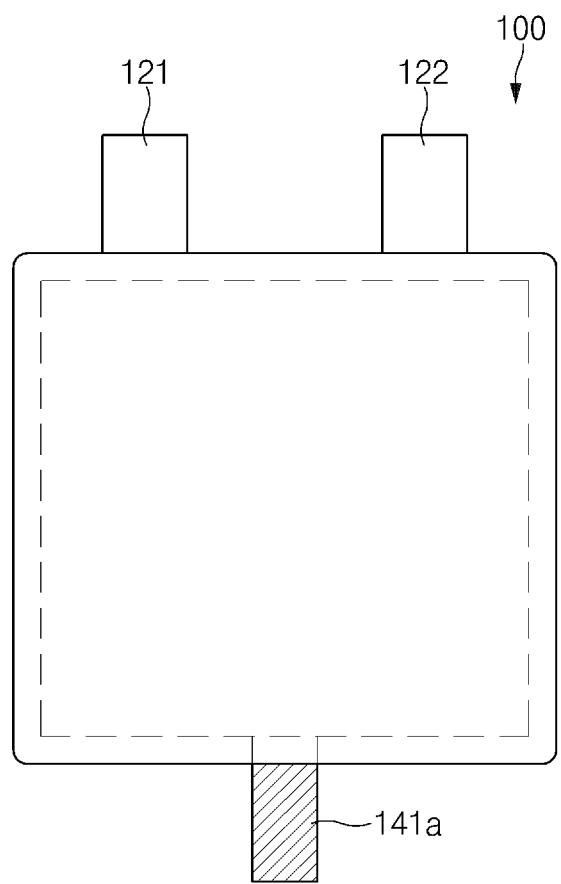
FIG. 7 is a plan view illustrating a fourth example in which the electrode and the ground terminal are disposed in the secondary battery according to an embodiment of the present invention.

FIG. 6 is a plan view illustrating a third example in which the electrode and the ground terminal are disposed in the secondary battery according to an embodiment of the present invention, and FIG. 7 is a plan view illustrating a fourth example in which the electrode and the ground terminal are disposed in the secondary battery according to an embodiment of the present invention.

Referring to FIGS. 4 to 7, the ground member 141 may comprise a ground terminal 141a extending in a lateral direction.

The ground terminal 141a may be disposed in one direction of four lateral directions of the ground member 141 in the plan view of the ground member 141. Also, the ground terminal 141a may be provided in plurality.

The positive electrode terminal 121 and the negative electrode terminal 122 may be disposed in the same direction of the four lateral directions or in two different directions of the four lateral directions in the plan view of the electrode stack 110.

Here, when the positive electrode terminal 121 and the negative electrode 122 are disposed in the two different directions of the four lateral directions in the plan view of the electrode stack 110, the ground terminal 141a may be disposed on one side of a side at which the positive electrode terminal 121 is disposed, a side at which the negative electrode terminal 122 is disposed, and a side at which the positive electrode terminal 121 and the negative electrode terminal 122 are not disposed.

Also, when the positive electrode terminal 121 and the negative electrode terminal 122 are disposed in the same direction of the four lateral directions in the plan view of the electrode stack 110, the ground terminal 141a may be disposed in a direction in which the positive electrode terminal 121 and the negative electrode terminal 122 are disposed or in a direction in which the positive electrode terminal 121 and the negative electrode terminal 122 are not disposed.

As a first example, referring to FIG. 4, the ground member 141 has a rectangular shape, and the ground terminal 141a may protrude in a width direction of the ground member 141.

Also, as a second example, referring to FIG. 5, the ground member 141 has a rectangular shape, and the ground terminal 141a may protrude in a longitudinal direction of the ground member 141.

Furthermore, as a third example, referring to FIG. 6, the ground member 141 has a rectangular shape, and the ground terminal 141a may be provided in plurality in the longitudinal direction of the ground member 141.

Also, as a fourth example, referring to FIG. 7, the ground member 141 may have a square shape. Here, the ground terminal 141a may be disposed on a side (an opposite side) corresponding to the side at which the positive electrode terminal 121 and the negative electrode terminal 122 are disposed.

Figure 8:
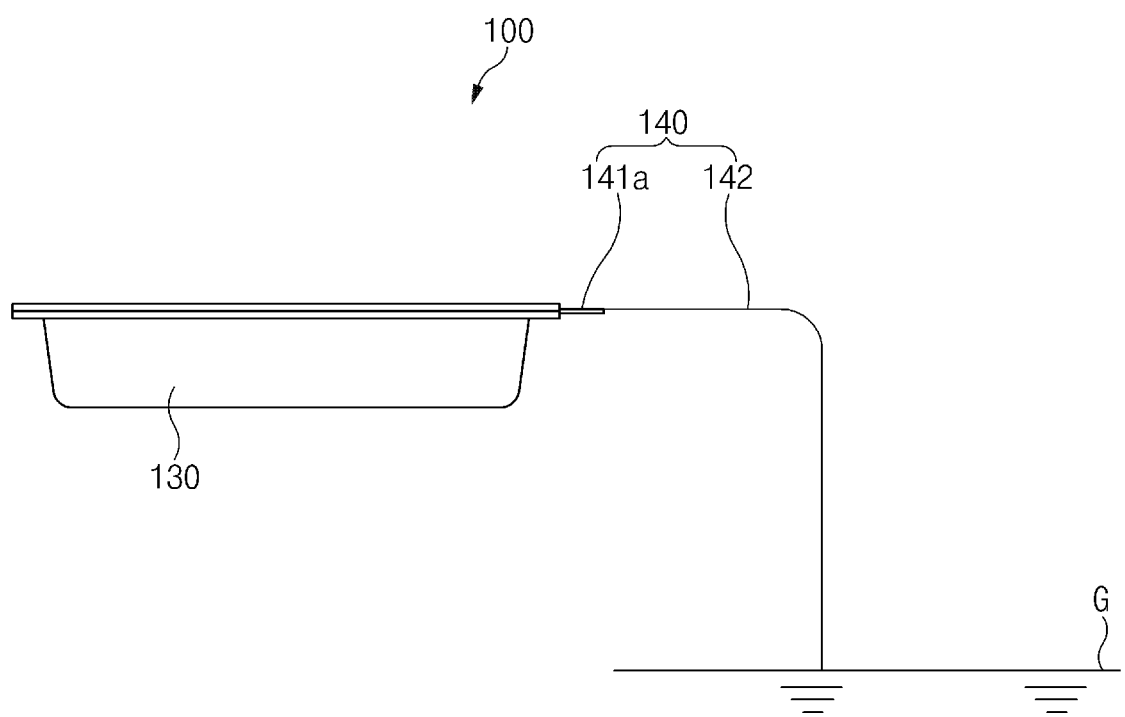
FIG. 8 is a conceptual view illustrating an example of a ground object of a ground line in the secondary battery according to an embodiment of the present invention.
Figure 9:
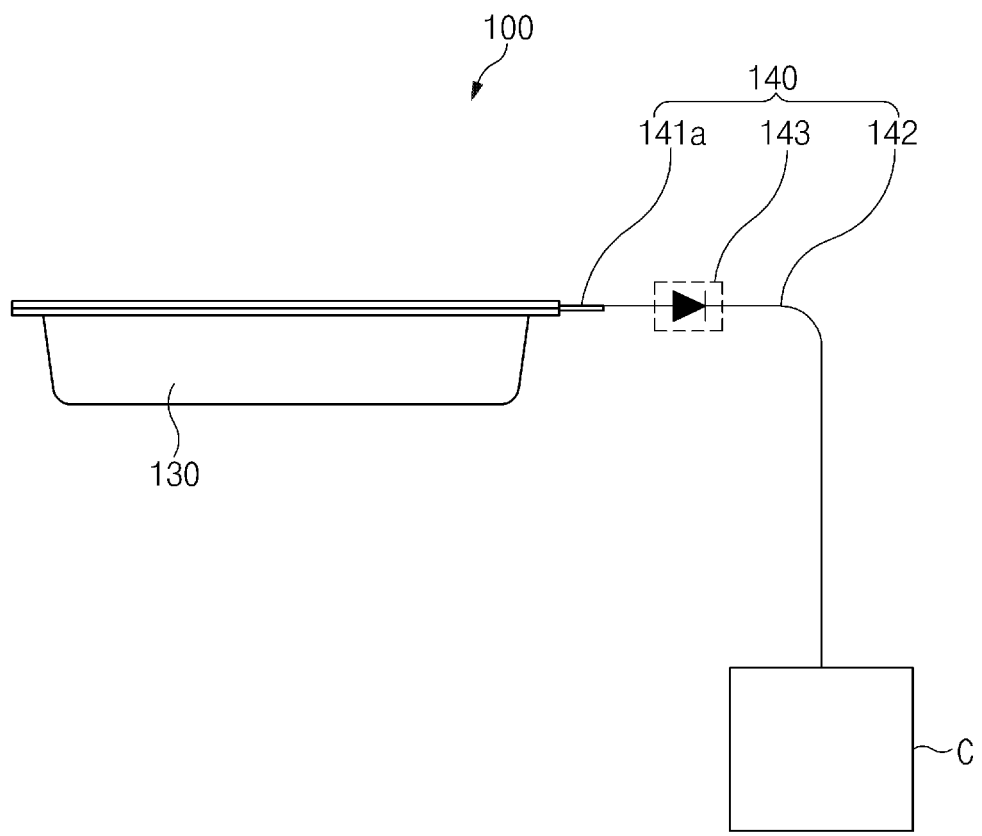
FIG. 9 is a conceptual view illustrating another example of the ground object of the ground line in the secondary battery according to an embodiment of the present invention.
Figure 10:
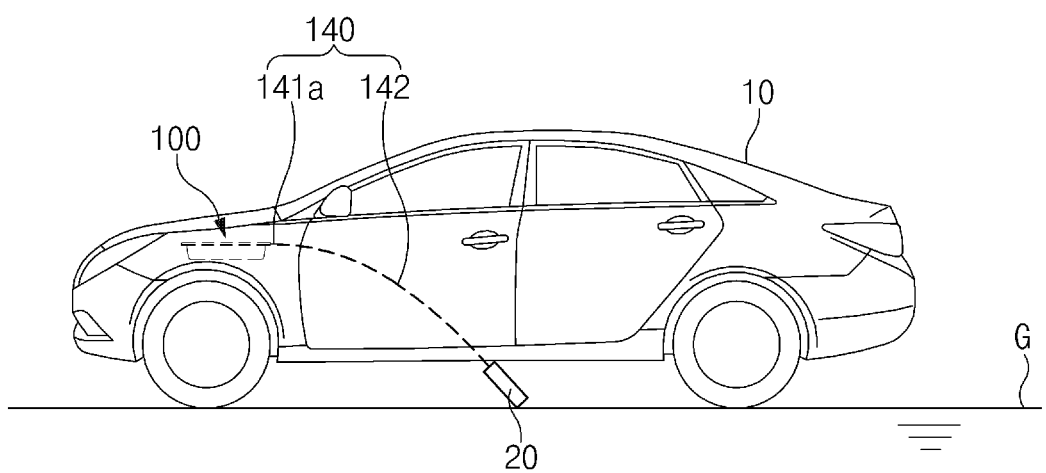
FIG. 10 is a conceptual view illustrating further another example of the ground object of the ground line in the secondary battery according to an embodiment of the present invention.

FIG. 8 is a conceptual view illustrating an example of a ground object of a ground line in the secondary battery according to an embodiment of the present invention, FIG. 9 is a conceptual view illustrating another example of the ground object of the ground line in the secondary battery according to an embodiment of the present invention, and FIG. 10 is a conceptual view illustrating further another example of the ground object of the ground line in the secondary battery according to an embodiment of the present invention.

Referring to FIGS. 8 to 10, the ground line 142 may have one side electrically connected to the ground member 141 and the other side grounded to one or more of a ground G, a storage battery C, and a conductive ground member 20 coming into contact with the ground G to allow the abnormal current introduced into the ground member 141 to flow to the outside through the ground line 142.

Referring to FIG. 8, for example, the other side of the ground line 142 may be grounded to the ground G to allow the abnormal current flowing from the ground line 142 to flow to the ground G.

Referring to FIG. 9, for another example, the storage battery C may store the abnormal current flowing from the ground line 142 therein. Here, the storage battery C may be provided as, for example, a capacitor.

Here, the ground part 140 may comprise a forward diode disposed on the ground line 142 so that current flows only from one side to the other side of the ground line 142.

Referring to FIG. 10, for another example, the conductive ground member 20 may be made of conductive felt and be disposed in a lower portion of a vehicle 10 to come into contact with the ground G. Thus, the abnormal current flowing from the ground line 142 through the conductive ground member 20 may flow to the ground G through the other side of the ground line 142.

In the secondary battery 100 comprising the above-described constituents according to an embodiment of the present invention, when a foreign substance such as a nail penetrates or bursts the electrode stack 110, the positive electrode 111 and the negative electrode 112 may meet each other to generate sudden abnormal current. Here, the abnormal current may flow to the outside of the electrode stack 110 through the ground part 140 to prevent fire such as heat and sparks from occurring.

While the present invention has been particularly shown and described with reference to exemplary embodiments thereof, this is for the purpose of specifically describing the present invention, and thus, the secondary battery according to the present invention is not limited thereto. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising
    a battery case;
    an electrode stack received within the battery case, the electrode stack including
        an electrode comprising a positive electrode and a negative electrode,
        a separator made of electrically insulating material,
        a positive electrode terminal electrically connected to the positive electrode, the positive electrode terminal extending out of the battery case, and
        a negative electrode terminal electrically connected to the negative electrode, the negative electrode terminal extending out of the battery case; and
    a ground part received within the battery case for grounding the electrode stack to the outside, the ground part including
        a ground member disposed on a first side of the separator to allow abnormal current flowing from at least one of the positive and negative electrodes disposed on a second side of the separator to be introduced therein, the second side being opposed to the first side across the separator, and
        a ground line having a first end electrically connected to the ground member, the ground line extending from the ground member out of the battery case and not in electrical contact with either the positive electrode terminal or the negative electrode terminal, such that the abnormal current introduced to the ground member is permitted to flow outside of the battery case via the ground line.

2. The secondary battery of claim 1, wherein the separator is disposed on each of opposing surfaces of the electrode.

3. The secondary battery of claim 1, wherein the separator surrounds an outer surface of the electrode.

4. The secondary battery of claim 1, wherein the ground member is disposed on one of two opposing surfaces of the electrode stack along a stacking direction of the electrode stack.

5. The secondary battery of claim 4, wherein the ground member has a plate shape.

6. The secondary battery of claim 1, wherein a plurality of the electrode stacks are provided, the plurality of electrode stacks being stacked on one another, and
wherein the ground member is disposed between the plurality of electrode stacks.

7. The secondary battery of claim 1, wherein a plurality of the electrode stacks are provided, the plurality of electrode stacks being stacked on one another, and
wherein the ground member is disposed between the plurality of electrode stacks and on both outermost ones of the electrode stacks.

8. The secondary battery of claim 1, wherein the ground member has a thickness of 1 um to 2000 um.

9. The secondary battery of claim 1, wherein the ground member is made of a conductive material.

10. The secondary battery of claim 9, wherein the ground member is made of an aluminum or copper material.

11. The secondary battery of claim 1, wherein the ground member is made of a flexible material.

12. The secondary battery of claim 1, wherein the ground line has a second end that is grounded to one or more of a ground, a storage battery, and a conductive ground member coming into contact with the ground so that the abnormal current introduced into the ground member flows to the outside.

13. The secondary battery of claim 12, wherein the ground part comprises a diode disposed on the ground line so that the current is permitted to flow only from the first end to the second end of the ground line.

14. The secondary battery of claim 1, wherein the ground member comprises a ground terminal that extends laterally from the ground member and is connected to the ground line.

15. The secondary battery of claim 14, wherein the ground terminal protrudes in one or more directions of four directions in a plan view of the ground member.

16. The secondary battery of claim 15, wherein a plurality of the ground terminals are provided.

17. The secondary battery of claim 14, wherein
the ground terminal extends laterally from the ground member along a direction away from a side of the electrode stack, the side selected from the group consisting of: a side on which the positive electrode terminal is disposed, a side on which the negative electrode terminal is disposed, and a side on which neither the positive electrode terminal nor the negative electrode terminal are disposed.

18. The secondary battery of claim 17, wherein the positive electrode terminal and the negative electrode terminal extend laterally from the electrode stack along the same direction as each other, and
wherein the ground terminal extends laterally from the ground member along a direction selected from the group consisting of: the direction along which the positive electrode terminal and the negative electrode terminal extend or a direction along which neither the positive electrode terminal nor the negative electrode terminal extend.

\* \* \* \* \*